United States Patent
Ahearn et al.

(10) Patent No.: US 9,472,034 B2
(45) Date of Patent: *Oct. 18, 2016

(54) ELECTRONIC LOCK SYSTEM

(71) Applicant: Schlage Lock Company LLC, Indianapolis, IN (US)

(72) Inventors: John Robert Ahearn, Pasadena, CA (US); Joseph Wayne Baumgarte, Carmel, IN (US); Gabriel Daniel Focke, Indianapolis, IN (US); Michael Scott Henney, Indianapolis, IN (US)

(73) Assignee: Schlage Lock Company LLC, Indianapolis, IN (US)

( * ) Notice: Subject to any disclaimer, the term of this patent is extended or adjusted under 35 U.S.C. 154(b) by 141 days.

This patent is subject to a terminal disclaimer.

(21) Appl. No.: 13/968,676

(22) Filed: Aug. 16, 2013

(65) Prior Publication Data

US 2014/0049363 A1     Feb. 20, 2014

Related U.S. Application Data

(60) Provisional application No. 61/684,097, filed on Aug. 16, 2012.

(51) Int. Cl.
     *G08C 19/00*     (2006.01)
     *G07C 9/00*     (2006.01)
     (Continued)

(52) U.S. Cl.
     CPC .......... *G07C 9/00174* (2013.01); *G06F 3/048* (2013.01); *G07C 9/00031* (2013.01); *G07C 9/00571* (2013.01); *H04W 4/008* (2013.01); *G07C 9/00182* (2013.01)

(58) Field of Classification Search
     CPC .......... G07C 9/00031; G07C 9/00174; G07C 9/00182; G07C 9/00309; G07C 9/00571

USPC ..................... 340/5.51, 5.61, 5.64
See application file for complete search history.

(56) References Cited

U.S. PATENT DOCUMENTS

| | | |
|---|---|---|
| 5,046,084 A | 9/1991 | Barrett |
| 5,654,696 A | 8/1997 | Barrett |

(Continued)

FOREIGN PATENT DOCUMENTS

JP     2009019423 A     1/2009

OTHER PUBLICATIONS

European Search Report; European Patent Office; European Patent Application No. 13829433.5; Mar. 24, 2016; 17 pages.

*Primary Examiner* — Firmin Backer
*Assistant Examiner* — Adnan Aziz
(74) *Attorney, Agent, or Firm* — Taft Stettinius & Hollister LLP

(57) ABSTRACT

A system is provided including a smartphone configured to wirelessly communication with an electronic lock. The smartphone wirelessly transmits data relating to a personalized user interface configuration, and the electronic lock receives the data from the smartphone, implements the personalized user interface configuration, receives additional information from the smartphone, and performs at least one function based on the additional information and the personalized user interface configuration. A method is also provided including personalizing a user interface configuration, transmitting the personalized user interface configuration from a smartphone to an electronic lock, implementing the personalized user interface configuration to the electronic lock, and performing via the electronic lock a function based upon the personalized user interface configuration.

19 Claims, 2 Drawing Sheets

(51) Int. Cl.
*H04W 4/00* (2009.01)
*G06F 3/048* (2013.01)

(56) References Cited

U.S. PATENT DOCUMENTS

| | | | |
|---|---|---|---|
| 6,133,847 A | 10/2000 | Yang | |
| 6,407,779 B1 | 6/2002 | Herz | |
| 6,937,140 B1* | 8/2005 | Outslay et al. | 340/5.73 |
| 6,968,153 B1 | 11/2005 | Heinonen et al. | |
| 7,933,945 B2* | 4/2011 | Krzyzanowski et al. | 709/200 |
| 7,933,968 B1 | 4/2011 | Zimmerman | |
| 8,922,334 B2 | 12/2014 | Hale et al. | |
| 2002/0002507 A1 | 1/2002 | Hatakeyama | |
| 2004/0119894 A1 | 6/2004 | Higgins et al. | |
| 2006/0094400 A1* | 5/2006 | Beachem | H04L 63/101 455/410 |
| 2006/0170533 A1 | 8/2006 | Chioiu et al. | |
| 2007/0021843 A1* | 1/2007 | Neill | G06F 21/72 700/1 |
| 2007/0050259 A1* | 3/2007 | Wesley | 705/16 |
| 2007/0130476 A1 | 6/2007 | Mohanty | |
| 2007/0290789 A1 | 12/2007 | Segev et al. | |
| 2008/0261560 A1 | 10/2008 | Ruckart | |
| 2009/0256676 A1* | 10/2009 | Piccirillo | E05B 41/00 340/5.65 |
| 2009/0259957 A1 | 10/2009 | Slocum et al. | |
| 2010/0017736 A1 | 1/2010 | Kim | |
| 2010/0138764 A1 | 6/2010 | Hatambeiki et al. | |
| 2010/0229194 A1 | 9/2010 | Blanchard et al. | |
| 2010/0269152 A1 | 10/2010 | Pahlavan et al. | |
| 2010/0283579 A1* | 11/2010 | Kraus et al. | 340/5.7 |
| 2010/0298032 A1 | 11/2010 | Lee et al. | |
| 2011/0074543 A1* | 3/2011 | Kaczmarz | G06Q 10/087 340/5.73 |
| 2011/0202415 A1 | 8/2011 | Casares et al. | |
| 2011/0246904 A1 | 10/2011 | Pinto et al. | |
| 2011/0311052 A1 | 12/2011 | Myers et al. | |
| 2012/0068817 A1 | 3/2012 | Fisher | |
| 2012/0072944 A1 | 3/2012 | Felt et al. | |
| 2012/0095791 A1 | 4/2012 | Stefik et al. | |
| 2012/0100868 A1 | 4/2012 | Kim et al. | |
| 2012/0157080 A1* | 6/2012 | Metivier | 455/420 |
| 2012/0280790 A1* | 11/2012 | Gerhardt et al. | 340/5.61 |
| 2012/0287058 A1 | 11/2012 | Lee | |
| 2013/0031261 A1 | 1/2013 | Suggs | |
| 2013/0165180 A1 | 6/2013 | Fukuda Kelley et al. | |
| 2013/0219455 A1* | 8/2013 | Bender | H04L 67/34 726/1 |
| 2014/0007222 A1 | 1/2014 | Qureshi et al. | |
| 2014/0049362 A1 | 2/2014 | Ahearn et al. | |
| 2014/0049364 A1 | 2/2014 | Ahearn et al. | |
| 2014/0049365 A1 | 2/2014 | Ahearn et al. | |

\* cited by examiner

ELECTRONIC LOCK SYSTEM

CROSS-REFERENCE TO RELATED APPLICATIONS

The present application claims the benefit of U.S. Provisional Patent Application No. 61/684,097 filed on Aug. 16, 2012, the contents of which are incorporated herein by reference in their entirety.

BACKGROUND

The present invention generally relates to a lock system, and more particularly, but not exclusively, relates to an electronic lock system.

SUMMARY

One embodiment of the present application is a unique electronic lock system. Other embodiments include apparatuses, systems, devices, hardware, methods, and combinations for an electronic lock system. Further embodiments, forms, features, aspects, benefits, and advantages of the present application shall become apparent from the description and figures provided herewith.

BRIEF DESCRIPTION OF THE FIGURES

The description herein makes reference to the accompanying figures wherein like reference numerals refer to like parts throughout the several views, and wherein.

DETAILED DESCRIPTION OF REPRESENTATIVE EMBODIMENTS

Figure 1:
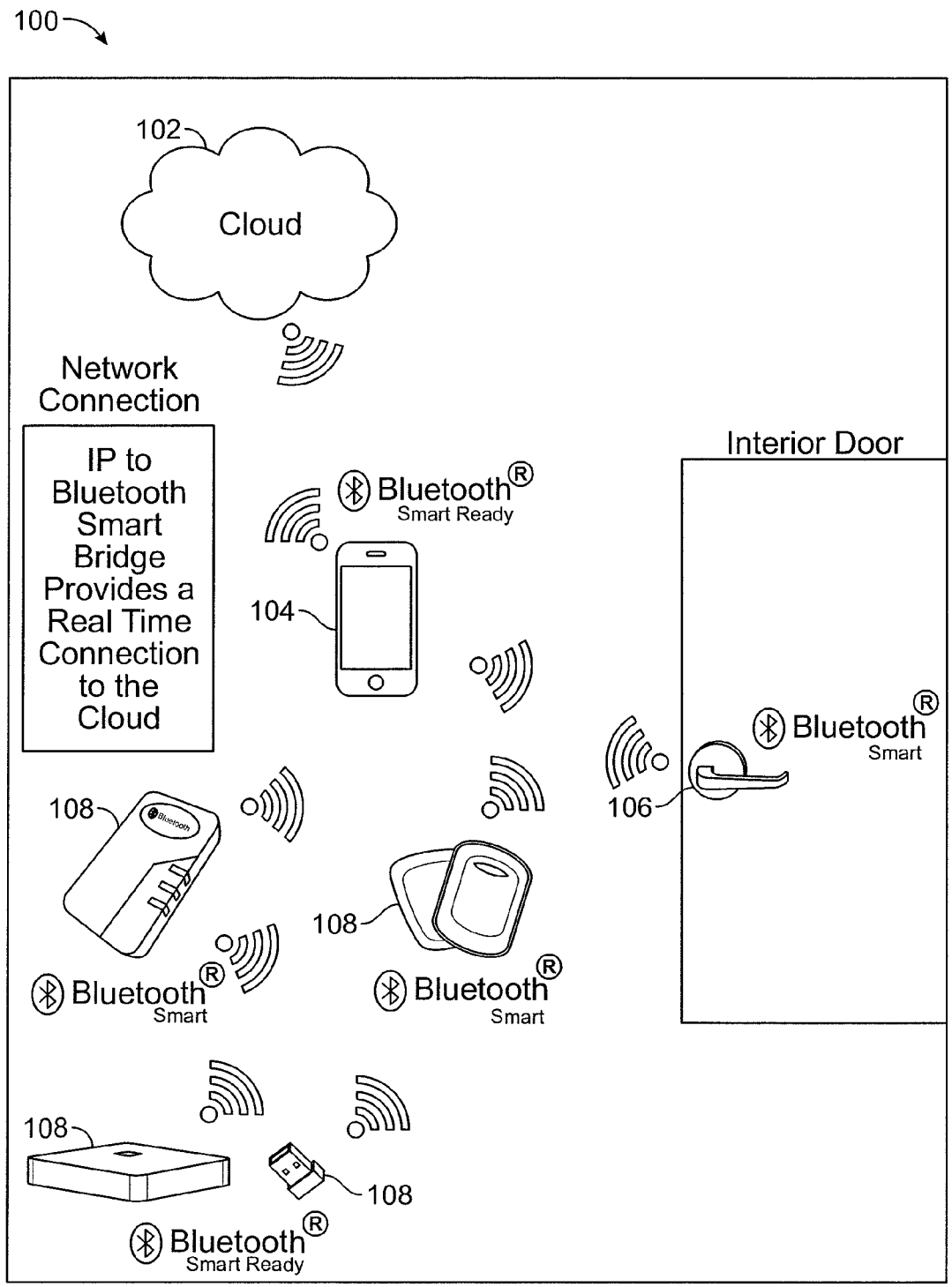
FIG. 1 is a schematic diagram of a system.

For the purposes of promoting an understanding of the principles of the invention, reference will now be made to the embodiments illustrated in the drawings and specific language will be used to describe the same. It will nevertheless be understood that no limitation on the scope of the invention is hereby intended. Any alterations and further modifications in the described embodiments, and any further applications of the principles of the invention as described herein are contemplated as would normally occur to one skilled in the art to which the invention relates.

FIG. 1 illustrates a system 100 includes a cloud 102, a smartphone 104, and an electronic lock 106, and may also include one or more devices 108. The cloud 102 may provide certain services related to access control, credentials, and other information and/or functions related to the electronic lock 106 such as statuses, configurations for user interfaces, updates, key management, credential management, tracking, notifications, etc. as discussed below. In addition, the cloud 102 may include one or more servers and/or databases (not shown) that host and store the services and information.

The smartphone 104 may be any type of smartphone that can communicate with the electronic lock 106 using a wireless communication protocol such as Bluetooth as one example. The smartphone 104 also includes software and hardware such that the smartphone 104 can communicate with the cloud 102 such as over the Internet as one example. The smartphone 104 may communicate user interface configurations to the electronic lock 106 based on selections made by a user. The user may make the selections using the user interface on the smartphone 104.

The electronic lock 106 may be used, for example, to lock a door at a residential property or a commercial property. The electronic lock 106 may be an online lock or an offline lock. The electronic lock 106 includes software and hardware such that the lock 106 can communicate wirelessly with the smartphone 104 to exchange information and the like. For example, the electronic lock 104 may include software and hardware to receive and implement user interface configurations from the smartphone 104, which the smartphone 104 may have received from the cloud 102.

The one or more devices 108 may include devices such as fobs, readers, bridges, and the like. The devices 108 also include software and/or hardware such that the devices 108 can communicate information wirelessly with the smartphone 104 or the lock 106 or other devices 108 using Bluetooth as one example. At least one device 108, such as a bridge, may have a wired connection to the cloud 102 for communicating with the cloud 102 over the Internet for example. The devices 108 are also capable of receiving configuration changes their user interfaces.

In the present application, the configuration of the user interface (UI) of the lock 106 may be personalized by the individual user rather than the user interface being set to a common, population wide set of characteristics. A user may personalize their UI experience through a combination of cloud 102 and smartphone 104 based services. Moreover, a credential user may personalize their experience with a lock 106 while maintaining the system administration rules and security. In addition, an administrator of the system 100 may also be able to uniquely customize the UI of locks 106 in the system 100.

In the present application, configuration options may be allowed and/or disallowed by a cloud-based access control services (ACS) center on the cloud 102 as a "Policy." The configuration of user options may be stored on the smartphone 104. For example, an electronic lock 102 on a door may be set to unlock immediately so that input from a user is minimal, as in the case when a user's hands and/or arms are full of groceries so that the user can gain entrance with ease as they approach a specific door.

Configuration policy settings can be unique to the user and unique for each of the locks 106 on doors to which they may have access. In enterprise environments, Policy on Cloud can allow single sign-on in harmony with Windows and Active Directory and other enterprise user log-in services. Policy on Cloud based control of Cache mode on the lock 106 may be pushed to a lock 106 through a smartphone 104.

Individual user Policies may be dynamically set by an administrator and pushed by the ACS center at the cloud 102 to the user's smartphone 104 and then to all or a sub-set of the Policies or configurations may be configurable by the user.

Access may be dynamically decided by a Policy Wisp retained on a smartphone 104, in which the Policy Wisp has been previously pushed to the smartphone 104 from the cloud 102. The Policy Wisp may determine what zone/building/door access rights a user has for offline zones/buildings/doors.

A user's smartphone may select when to store (hold) information, send information to the cloud 102 or to send information to a lock 106. This may be used to optimize data transfer for frequently connected locks 106 and may be used to store and forward information to locks 106 that are connected infrequently or outside the range of a "real-time" or frequent data connection to the cloud 102.

The user configuration options for a non-online credential, such as a wireless fob, may be managed by a compatible personal computer (not shown) if there is no ACS on cloud 102 or by some other compatible communicating device, such as an IP to wireless bridge 108 that is connected to the ACS in the cloud 102.

Manual programming of offline locks may be accomplished by the user via their smartphone 104. The user interface is used as a master programming credential/master programming device for locks 106 such as residential locks.

Americans with Disability Act settings may be configured by the user. Disabled individuals will have varying levels of ability. This provides options for a disabled user to select their comfort/challenge level for interacting with the door lock 106 and user interface device such as a fob or smartphone or other device.

A user may choose to use gestures, in smartphones 106 and fobs 108 that support them. Gestures may vary from a simple strong tap on the device's housing to a gesture such as rotating the device to emulate turning a door handle to be used as a verification to unlock a door. Custom user defined gestures may be allowed to perform verification tasks.

Figure 2:
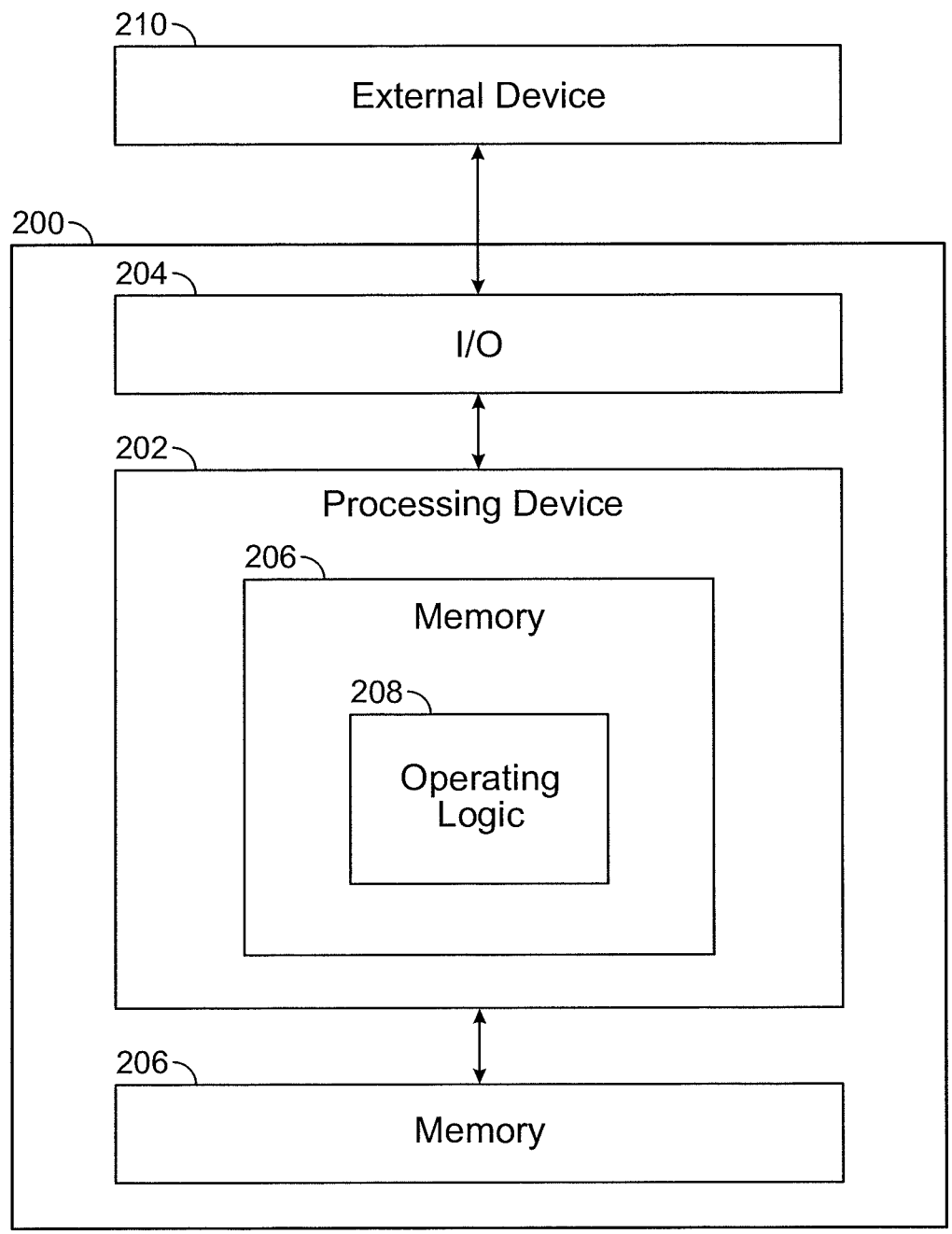
FIG. 2 is a schematic diagram of a computer.

FIG. 2 is a schematic diagram of a computer 200. Examples of the computer 200 include the server and/or database at the cloud 102, the smartphone 104, the electronic lock 106, and/or the devices 108 shown in FIG. 1. Computer 200 includes a processing device 202, an input/output device 204, memory 206, and operating logic 208. Furthermore, computer 200 communicates with one or more external devices 210.

The input/output device 204 may be any type of device that allows the computer 200 to communicate with the external device 210. For example, the input/output device may be a network adapter, network card, or a port (e.g., a USB port, serial port, parallel port, VGA, DVI, HDMI, FireWire, CAT 5, or any other type of port). The input/output device 204 may be comprised of hardware, software, and/or firmware. It is contemplated that the input/output device 204 includes more than one of these adapters, cards, or ports.

The external device 210 may be any type of device that allows data to be inputted or outputted from the computer 200. For example, the external device 210 may be a computer, a server, a database, the cloud 102, the smartphone 104, the electronic lock 106, the devices 108, a printer, a display, an alarm, an illuminated indicator, a keyboard, a mouse, mouse button, or a touch screen display. Furthermore, it is contemplated that the external device 210 may be integrated into the computer 200. For example, the computer 200 may be a smartphone, a laptop computer, or a tablet computer in which case the display would be an external device 210, but the display is integrated with the computer 200 as one unit, which consistent with the general design of smartphones, laptop computers, tablet computers, and the like. It is further contemplated that there may be more than one external device in communication with the computer 200.

Processing device 202 can be of a programmable type, a dedicated, hardwired state machine, or a combination of these; and can further include multiple processors, Arithmetic-Logic Units (ALUs), Central Processing Units (CPUs), or the like. For forms of processing device 202 with multiple processing units, distributed, pipelined, and/or parallel processing can be utilized as appropriate. Processing device 202 may be dedicated to performance of just the operations described herein or may be utilized in one or more additional applications. In the depicted form, processing device 202 is of a programmable variety that executes algorithms and processes data in accordance with operating logic 208 as defined by programming instructions (such as software or firmware) stored in memory 206. Alternatively or additionally, operating logic 208 for processing device 202 is at least partially defined by hardwired logic or other hardware. Processing device 202 can be comprised of one or more components of any type suitable to process the signals received from input/output device 204 or elsewhere, and provide desired output signals. Such components may include digital circuitry, analog circuitry, or a combination of both.

Memory 206 may be of one or more types, such as a solid-state variety, electromagnetic variety, optical variety, or a combination of these forms. Furthermore, memory 206 can be volatile, nonvolatile, or a mixture of these types, and some or all of memory 206 can be of a portable variety, such as a disk, tape, memory stick, cartridge, or the like. In addition, memory 206 can store data that is manipulated by the operating logic 208 of processing device 202, such as data representative of signals received from and/or sent to input/output device 204 in addition to or in lieu of storing programming instructions defining operating logic 208, just to name one example. As shown in FIG. 2, memory 206 may be included with processing device 202 and/or coupled to the processing device 202.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
   a smartphone configured to wirelessly transmit data relating to a personalized user interface configuration created on the smartphone by a user of the smartphone;
   a cloud network including an access control service configured to allow or disallow the personalized user interface configuration based on a policy that is dynamically controlled by an administrator of the access control service, wherein the smartphone is further configured to wirelessly communicate with the cloud network, and further wherein the access control service pushes the dynamically controlled policy to the smartphone from the cloud network when the dynamically controlled policy is set; and
   an electronic lock configured to receive the personalized user interface configuration created by the user in response to the personalized user interface configuration being allowed by the dynamically controlled access policy pushed to the smartphone, to implement the personalized user interface configuration in response to the personalized user interface configuration being received, and to perform at least one function based on the dynamically controlled policy and the personalized user interface configuration, wherein the at least one function includes determining an access right for the smartphone in response to the dynamically controlled policy.

2. The system of claim 1, wherein the policy is based upon an identity of the smartphone.

3. The system of claim 1, wherein the policy is based upon an identity of the electronic lock.

4. The system of claim 1, wherein the policy is transmitted wirelessly to the smartphone from a wireless device that is connected to the cloud network via a wired connection.

5. The system of claim 1, further comprising a device configured to communicate information wirelessly with at least one of the smartphone and the electronic lock.

6. The system of claim 5, wherein the device is one of a fob, a reader, and a bridge.

7. The system of claim 5, wherein the device is configured to communicate with the cloud network via a wired connection.

8. The system of claim 1, wherein communication between the electronic lock and the smartphone is wireless communication.

9. The system of claim 8, wherein the wireless communication is Bluetooth communication.

10. The system of claim 9, wherein communication between the smartphone and the cloud at least partly occurs over the Internet.

11. The system of claim 1, wherein communication between the smartphone and the cloud is wireless communication.

12. The system of claim 1, wherein communication between the smartphone and the cloud at least partly occurs over the Internet.

13. The system of claim 1, wherein the electronic lock is used in association with a door to control access through the door.

14. A method, comprising:
personalizing a user interface configuration for a user to interface with an electronic lock with a smartphone in response to user selections on the smartphone directed to the user interface configuration;
allowing the user interface configuration based on a dynamically controlled policy from a cloud network wirelessly connected to the smartphone, wherein the dynamically controlled policy includes an access policy and the dynamically controlled policy is pushed to the smartphone from the cloud network when the dynamically controlled policy is set by an administrator;
transmitting the allowed personalized user interface configuration from the smartphone to the electronic lock;
implementing the personalized user interface configuration in the electronic lock; and
performing via the electronic lock a function based upon the personalized user interface configuration and the dynamically controlled policy, wherein the function includes determining an access right of the user in response to the access policy.

15. The method of claim 14, wherein communication between the electronic lock and the smartphone is wireless communication.

16. The method of claim 15, wherein the wireless communication is Bluetooth communication.

17. The method of claim 15, wherein communication between the smartphone and the cloud network at least partly occurs over the Internet.

18. The method of claim 14, wherein communication between the smartphone and the cloud network is wireless communication and at least partly occurs over the Internet.

19. The method of claim 14, wherein the electronic lock is used in association with a door to control access through the door.

\* \* \* \* \*